United States Patent [19]
Elrod, Jr.

[11] Patent Number: 5,551,481
[45] Date of Patent: Sep. 3, 1996

[54] METHOD OF MANUFACTURING DIRECT DRIVE SERVOVALVE AND DIRECT DRIVE SERVOVALVE RESULTING THEREFROM

[75] Inventor: Alvon C. Elrod, Jr., Ventura, Calif.

[73] Assignee: HR Textron Inc., Valencia, Calif.

[21] Appl. No.: 187,938

[22] Filed: Jan. 27, 1994

[51] Int. Cl.⁶ .................................................. F15B 13/044
[52] U.S. Cl. .............................. 137/625.65; 251/129.11
[58] Field of Search .................. 137/625.65; 251/129.11; 310/36

[56] References Cited

U.S. PATENT DOCUMENTS

| | | | |
|---|---|---|---|
| 2,697,016 | 12/1954 | Spurgeon . | |
| 2,769,943 | 11/1956 | Matthews . | |
| 3,007,494 | 11/1961 | Herzl | 137/625.65 |
| 3,435,393 | 3/1969 | Meisel | 310/36 X |
| 4,197,474 | 4/1980 | Honigsbaum . | |
| 4,339,737 | 7/1982 | Meyers et al. . | |
| 4,452,423 | 6/1984 | Beblavi et al. . | |
| 4,507,634 | 3/1985 | Vanderlaan | 310/36 X |
| 4,641,812 | 2/1987 | Vanderlaan et al. | 251/129.11 X |
| 4,702,123 | 10/1987 | Hirao et al. . | |
| 4,793,377 | 12/1988 | Haynes et al. . | |
| 4,809,742 | 3/1989 | Grau | 251/129.11 X |
| 5,035,264 | 7/1991 | Amico et al. | 251/129.11 X |
| 5,263,681 | 11/1993 | Laux | 251/129.11 |
| 5,275,478 | 1/1994 | Schmitt et al. | 137/884 X |

FOREIGN PATENT DOCUMENTS

| | | |
|---|---|---|
| 601808 | 7/1960 | Canada . |
| 1521668 | 8/1978 | United Kingdom . |

*Primary Examiner*—Gerald A. Michalsky
*Attorney, Agent, or Firm*—Robbins, Berliner & Carson, LLP

[57] ABSTRACT

A method of manufacturing a direct drive servovalve including the steps of providing a completely packaged drive motor and a hydraulic stage positioning the drive motor upon the hydraulic stage and in engagement with a valve contained within the hydraulic stage applying a signal to the motor which is proportional to a desired output signal from the hydraulic stage moving the motor while measuring the output from the hydraulic stage and when the predetermined desired output is obtained from the hydraulic stage, then securing the motor to the hydraulic stage.

10 Claims, 3 Drawing Sheets

METHOD OF MANUFACTURING DIRECT DRIVE SERVOVALVE AND DIRECT DRIVE SERVOVALVE RESULTING THEREFROM

FIELD OF THE INVENTION

This invention relates generally to direct drive servovalves and more particularly to a method of manufacturing a direct drive servovalve wherein a fully assembled limited angle drive motor is assembled with a separate hydraulic stage and after appropriate adjustment the combination is secured in place and to the direct drive servovalve resulting therefrom.

BACKGROUND OF THE INVENTION

Torque motor driven direct drive valves are well known in the art including those which operate through the utilization of a rotary torque motor having a drive member extending from the rotor thereof into contact with a hydraulic valve to directly move the valve to thereby control the flow of fluid from a source thereof to a load in response to electrical signals applied to the drive motor. Such direct drive valves are very time consuming to manufacture because the precise positioning of the stator, rotor, the position feed back device, rotor stops and the valve flow control components in relationship to each other is required to achieve optimum performance and is extremely complex. If a particular hydraulic component of the valve portion of the direct drive valve is changed because of a particular application, added extensive costs are incurred. This results because a complete disassembly and reassembly of all of the motor components is usually required.

Typical of such prior art direct drive servovalves is that illustrated in U.S. Pat. No. 4,793,377, the disclosure of which is incorporated herein by this reference. Other prior art known to applicant which also includes direct drive valves of the type above referred to is U.S. Pat. Nos. 4,197,474; 2,769,943; 2,697,016; 4,452,423; 4,339,737 and 4,702,123 as well as Canadian Patent No. 601808 issued Jul. 19, 1960 and United Kingdom Patent No. 1521668 issued Aug. 16, 1978.

Although the prior art direct drive servovalves disclosed in each of these references function quite well for the purposes intended, they nonetheless suffer from the limitations as above set forth and are therefore complex and relatively expensive to assemble or to repair. In addition to all of the foregoing difficulties, particular attention must be given to linear spacing and concentricities of rotating parts and bearings to ensure a smooth and optimum performance for the direct drive servovalve.

SUMMARY OF THE INVENTION

In accordance with the present invention there is provided a method of manufacturing a direct drive servovalve which includes providing a completely packaged motor containing all of the required components including a stator, a rotor, support bearings, fluid isolation, motor position sensor, rotor stops and a structural motor case. There is also provided a hydraulic stage which includes a housing along with valve means for controlling the flow of fluid from a source thereof to a load in response to electrical signals applied to the motor. The completely packaged motor is positioned upon the hydraulic stage housing with an appropriate mechanical connection between the motor rotor and the control valve in the hydraulic stage. Electrical signals are applied to the motor, a source of fluid under pressure is applied to the hydraulic stage, the output of the hydraulic stage is measured, the electrical motor is moved until the measured output of the hydraulic stage corresponds to a predetermined desired output which is proportional to the applied electrical signals. Thereafter the motor is secured to the hydraulic stage.

The present invention also includes a direct drive servovalve including a hydraulic stage having a housing and a drive motor. The drive motor includes an eccentrically disposed drive member engaging a valve in the hydraulic stage and an exterior casing. The exterior casing includes means permitting rotational movement of the motor relative to the housing and fastener means, the casing being non-moveable when the fastener means is tightened and moveable when the fastener means is loose.

DETAILED DESCRIPTION OF THE DRAWINGS

Figure 1:
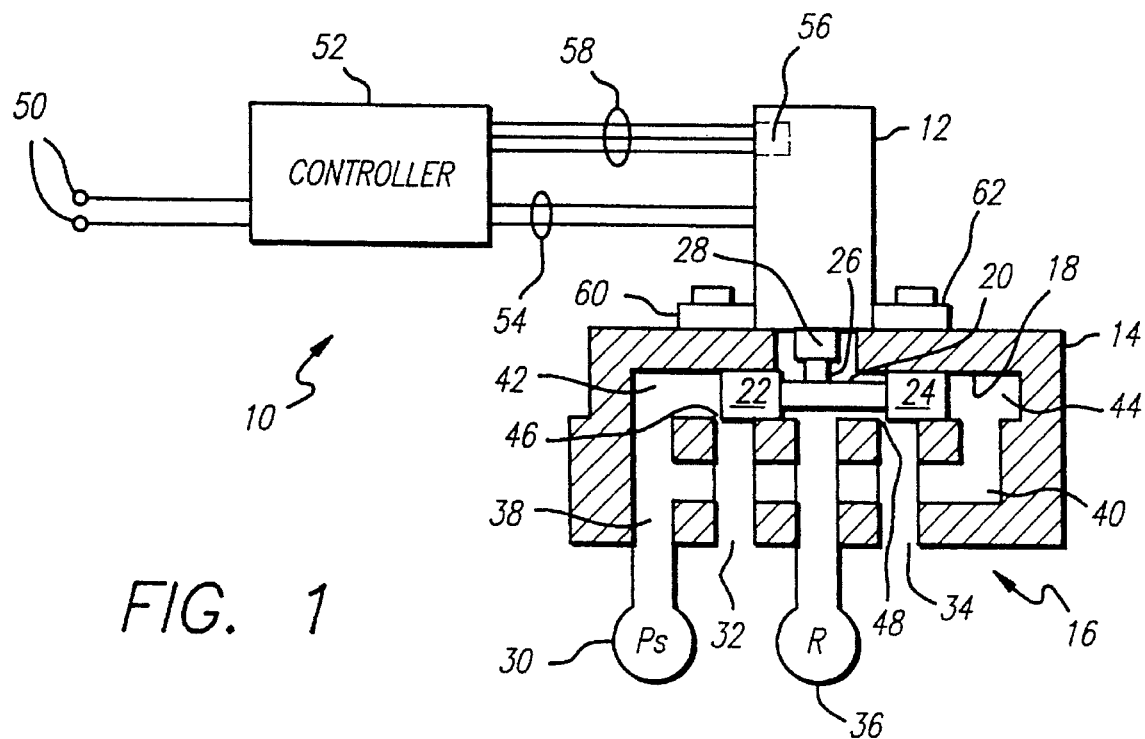
FIG. 1 is a schematic diagram partly in cross section illustrative of a direct drive servovalve constructed in accordance with the method of the present invention.

By reference now more particularly to FIG. 1 there is shown a schematic representation of a direct drive servovalve constructed in accordance with the method of the present invention. FIG. 1 is schematic only and is provided as representative of one type of structure which may be utilized and it will be understood by those skilled in the art that other types of direct drive servovalves may be utilized, for example, those disclosed in the above referred to prior art patents.

It is an important feature of the present invention that the direct drive servovalve provided from practicing the method of the present invention be relatively simple in its final assembly or in any type of overhaul which may occur during the life of the servovalve. It is contemplated that when utilizing servovalves built in accordance with the method of the present invention that the very time consuming and complex operations previously required either to construct the servovalve in the first instance or to overhaul it during its lifetime are eliminated. This is accomplished by effectively providing two modules or stages which can be combined into the final direct drive servovalve.

The first of these modules is the completely assembled and packaged drive motor which will be a limited angle torque motor. All of the components of the limited angel torque motor, for example, as is shown in detail in FIG. 4, which will be described more fully below, are fully assembled into a completed packaged operable drive motor. An inventory of such drive motors can be provided and maintained in stock until such a time as the direct drive servovalve is to be constructed.

The second of the modules is the hydraulic module or stage. This stage would include the housing and the valve, in accordance with a specific embodiment, a spool valve. The various components of the hydraulic stage can also be maintained in stock until such time as it is desired to build a particular direct drive servovalve. When such time arises then the components of the hydraulic stage can be assembled together to provide the completed hydraulic stage.

After the completed hydraulic stage is provided, then the motor is merely mounted upon the housing of the hydraulic stage, properly adjusted to provide the desired output flow responsive to applied input signal and then the motor and hydraulic stages are secured together while maintaining such desired positioning. As can be seen, this provides a very simple straight forward inexpensive way in which the direct drive servovalve can be constructed or alternatively overhauled. In the overhaul procedure, for example, if the motor in a valve is not operating properly, the motor can be merely removed and a new one substituted in its place, and the new motor can be merely clamped down or secured after the appropriate adjustments as above described.

As is shown in FIG. 1 the direct drive servovalve 10 includes a fully packaged motor 12 which is mounted upon the housing 14 of the hydraulic stage 16. Positioned within a bore 18 within the housing 14 is a spool valve 20 having a pair of lands 22 and 24. An eccentric drive member 26 is affixed to the shaft 28 of the rotor of the motor 12. As is known to those skilled in the art, the eccentric drive member 26 is in turn attached to the spool valve 20 in such a manner that as the rotor shaft 28 rotates, the spool valve 20 moves reciprocally within the bore 18. Movement of the spool valve causes fluid to flow from a source 30 thereof under pressure through passageways formed within the housing and outwardly through ports 32 or 34 to a load (not shown) and from the load through ports 32 or 34 to system return 36.

As is shown, passageways 38 and 40 apply fluid under pressure to end chambers 42 and 44 and into engagement with the lands 22 and 24 of the spool valve 20. If the rotor shaft 28 has moved responsive to signals applied to the motor 12 such that the eccentric drive 26 has moved in such a way to translate the spool 20 toward the right as viewed in FIG. 1, and as illustrated therein, the land 22 will uncover the metering port 46 and land 24 the port 48. The port 46 permits flow from the source 30 through the chamber 42, the port 46 and out the port 32 to the load. At the same time fluid will flow from the load through the port 34, the now opened metering port 48 and to return 36. Obviously, if the shaft 28 rotates in the opposite direction, the reverse operation will occur.

Command signals are applied to the input terminals 50 which in turn are connected to a controller 52. The controller, after operation upon the command signals then applies over the leads 54 an input signal to the motor 12 to cause rotational positioning of the rotor 28. Rotor position is sensed by a sensor 56 which in turn applies appropriate signals over the leads 58 back to the controller 52. These signals are utilized in conjunction with the command signals to provide the desired operation of the motor 12 and in turn the spool valve 20.

In assembling the structure as illustrated in FIG. 1, the fully assembled and packaged motor 12 is mounted upon the housing 14 with the drive 26 engaging the spool valve 20. Fluid under pressure is applied as shown at 30 and an appropriate command signal is applied to the input terminals 50. It is known that in response to the applied input signal the output appearing at the ports 32 and 34 should be a predetermined pressure and/or flow. The motor 12 is moveable upon the housing 14. The motor is rotated and otherwise adjusted until, with the signal applied to the terminals 50, the desired output signal is obtained at the ports 32 and 34. When such has occurred, the motor 12 is secured to the housing 14 by an appropriate fastening or clamping means as illustrated at 60 and 62. As will be more fully described below, the clamping means 60 and 62 may be lugs or ears which are formed as a part of the casing for the motor 12 and which are moved as the motor 12 is rotated. Appropriate slots would be provided in these lugs to permit rotation of the motor 12 as desired for adjustment. Once adjusted, fasteners are secured thereby holding the motor 12 firmly in its adjusted position upon the housing 14.

Figure 2:
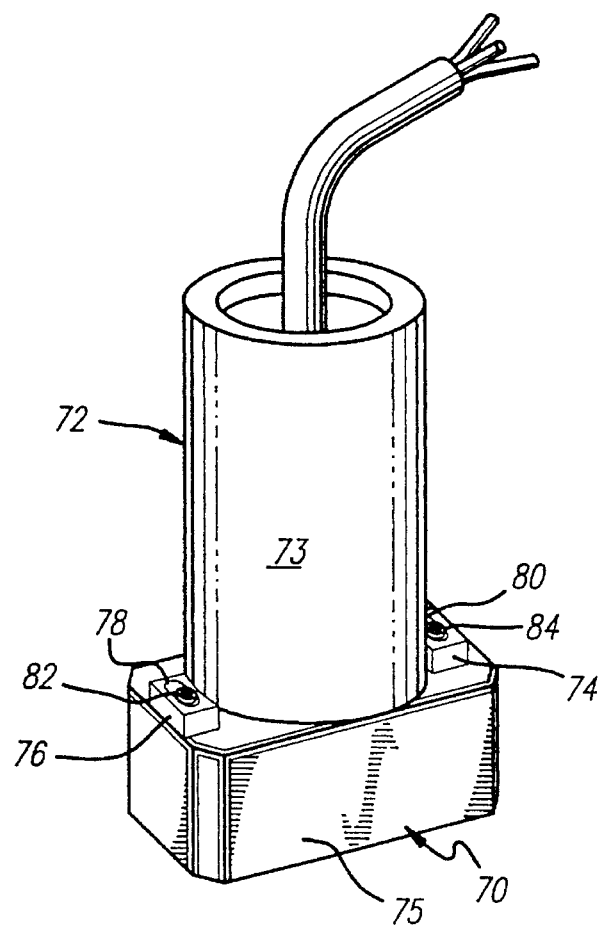
FIG. 2 is a perspective view of one embodiment of a direct drive servovalve constructed in accordance with the principles of the present invention.

Referring now more particularly to FIG. 2, one embodiment of a direct drive servovalve constructed in accordance with the principles of the present invention is illustrated. As is therein shown, a hydraulic stage 70 has mounted thereon a completed and packaged motor stage 72. The motor casing 73 has a pair of clamping lugs 74 and 76 extending therefrom. The lugs may be provided as by welding brazing, or otherwise securing them non-removeably to the casing 73. Each of the lugs has a slot 78 and 80 respectively formed therein. An appropriate fastener 82 and 84 is inserted through the slots 78 and 80 within the lugs and is threadably received within an appropriate threaded opening (not shown) in the housing 75 of the hydraulic stage 70. As above indicated, an appropriate signal is applied to the motor and it is adjusted rotatably on top of the hydraulic stage until the desired output pressure and/or flow from the hydraulic stage proportional to the applied electrical signals is obtained. Thereafter, the fasteners 82 and 84 are tightened thereby securing the motor stage 72 to the hydraulic stage 70.

Figure 3:
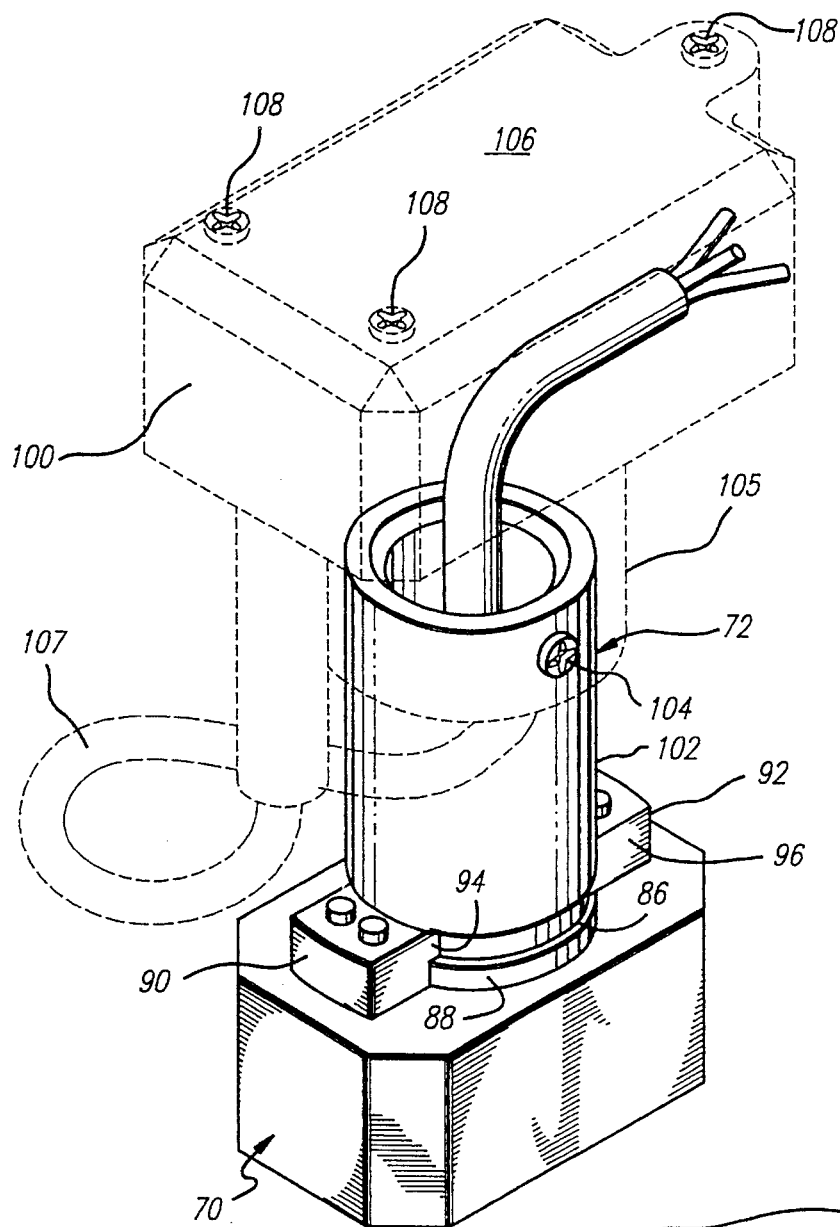
FIG. 3 is an alternative embodiment of the direct drive servovalve as shown in FIG. 2.

Referring now more particularly to FIG. 3 an alternative arrangement is illustrated. All of the parts shown in FIG. 3 are the same as those shown in FIG. 2 except that the motor 72 has a groove 86 formed adjacent the base 88 thereof. A pair of hold down cleats or clamps 90 and 92 are secured to the top of the hydraulic stage 70 by way of appropriate fasteners. As is shown, the clamps 90 and 92 include a flange 94 and 96 respectively which extends radially inwardly and into the groove 86. During the construction of the direct drive servovalve and while the appropriate signals are applied to the motor 72 and it is being adjusted to provide the desired output flow and/or pressure from the hydraulic stage 70, the fasteners are maintained loose and the motor is rotated freely while the flanges 94 and 96 remain within the groove 86. When the motor reaches the desired position where the predetermined output from the hydraulic stage exists, the fasteners are then tightened so that the hold down clamps or cleats 90 and 92 engage the bottom of the groove 86 thus clamping the lower surface 88 of the motor housing to the hydraulic stage 70. An appropriate O-ring or other sealing structure may be provided in the bottom of the motor housing or alternatively in the hydraulic stage housing to seal the motor to the hydraulic stage and to prevent leakage of fluid.

As is shown in dashed lines in FIG. 3 the controller 52 as shown in FIG. 1 may be packaged within a controller housing 100 which is attached to the motor housing 102 by an appropriate fastener 104. The fastener 104 extends through a cup-like member 105 which extends downwardly from the controller housing 106. The upper part of the motor 72 is received within the cup-like member. An electrical conduit 107 having the appropriate leads as shown at 54 and 58 in FIG. 1 extends between the housing 100 and the motor 72. A cover 106 is provided on top of the housing 100 and is secured in place by appropriate fasteners 108 which may be removed to service the integrated electronics module which is contained within the housing 100 and forms the controller 52.

Figure 4:
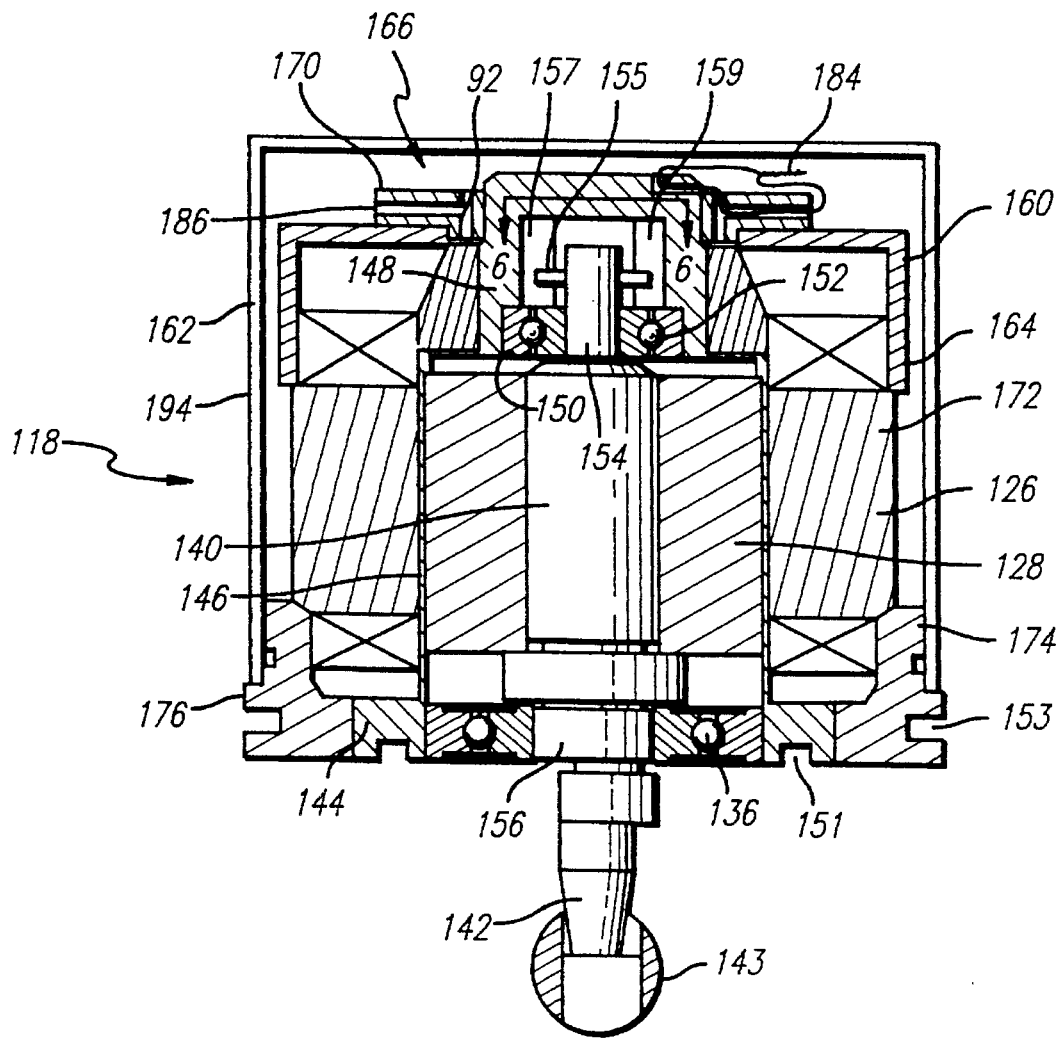
FIG. 4 is a cross sectional view of a direct drive motor constructed in accordance with the principles of the present invention.
Figure 6:
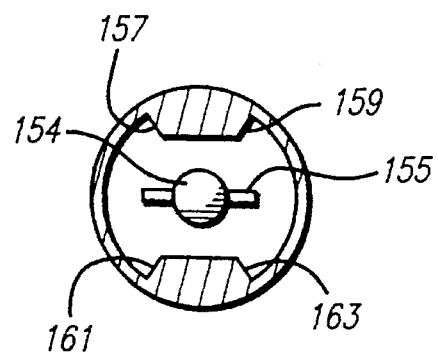
FIG. 6 is a partial view, partly in cross section, taken about the lines 6—6 of FIG. 4.

The completed and packaged motor module may include a motor having various types of configuration. Typically the motor will be a limited angle torque motor of the type commonly utilized in direct drive valves and as well known to those skilled in the art. One example of such a motor is shown in FIG. 4 and FIG. 6 to which reference is hereby made. As is therein shown, a rotor 128 having a shaft 140 is disposed within an isolation tube 146. The isolation tube includes a flange 144 having a bearing means 136 disposed therein. At the opposite end of the isolation tube there is provided a recess 150 which receives a second bearing means 152. An extension 154 on the shaft 140 is received within the bearing means 152 while at the opposite end the extension or end 156 of the shaft 140 is received within the bearing means 136.

The shaft extension 154 receives a pin 155 therethrough, the ends of which engage shoulders 157, 159, 161 and 163 to provide stop means preventing over rotation of the shaft 140 beyond the desired angle. The isolation tube 146 has the base 144 received within a support ring 176. The stator 126 rests upon a shoulder 174 of the support ring 176 and is clamped in place by a retainer assembly 166 which is secured to the closed upper end 148 of the isolation tube 146. As is shown the retainer assembly 166 includes a retainer 160 having an annular member 162 and a downwardly depending skirt 164. A retainer ring 170 is threadably secured to the outer surface of the upper closed end 148 of the isolation tube 146. The skirt 164 applies a downwardly exerted clamping pressure against the pole piece 172 of the stator 126. As a security measure a lock wire 184 is threaded through appropriate openings provided in the retainer ring 170 to preclude inadvertent loosening of the retainer assembly 166. To accommodate the locking wire, openings 186 are provided in the ring 170 and also in the upper closed end 48 of the isolation tube 46. A motor casing 194 is received upon the member 176 to environmentally protect the internal portion of the motor 118. As is shown, an eccentric drive 142 having a ball 143 affixed thereto extends from the lower portion of the rotor shaft 140. As above described the ball 143 engages the valve member which is disposed within the hydraulic stage.

An appropriate O-ring or other similar sealing member may be received within the groove 151 which will then engage the upper surface of the hydraulic stage housing to prevent the leakage of fluid. As is also shown there is provided a continuous annular groove 153 in the member 176 which is utilized to receive the flanges of the hold down cleats as shown at 90 and 92 in FIG. 3. The continuous groove 153 provides 360° rotation of the motor 118 upon the hydraulic stage housing during assembly of the servovalve.

Figure 5:
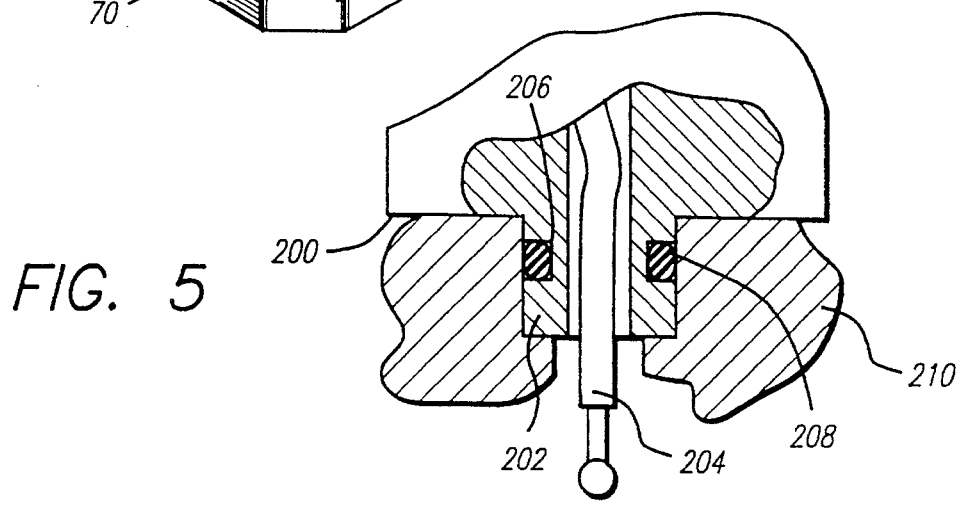
FIG. 5 is a partial view, partially in cross section illustrating an alternative sealing of the drive motor to the hydraulic stage.

As shown in FIG. 5 to which reference is hereby made the completely packaged motor may be sealed with the hydraulic stage housing by use of a radial static seal. The base 200 includes a downwardly extending portion 202 through which the rotor 204 extends. The portion 202 defines a groove 206 within which an "O" ring 208 is received. The "O" ring 208 provides a seal with housing 210 of the hydraulic stage.

The thus completely assembled motor as shown in FIG. 4 is placed upon the hydraulic stage and positioned as above described to obtain the desired output flow and/or pressure from the hydraulic stage responsive to the application of input signals to the controller. When such occurs, the hold down cleats are then secured in place to thereby provide a relatively simple and inexpensive method of construction of a direct drive servovalve. If desired the fasteners may be loosened and the motor again adjusted for any particular application.

What is claimed is:

1. A method of manufacturing a direct drive rotary-to-linear servovalve comprising:

(A) providing a completely packaged self contained rotary limited angle torque motor, said package having all required motor components therein including a stator, a rotor having a drive means, stops to limit the angle of rotation of said rotor, an isolation tube surrounding said rotor to isolate said stator from system fluid, support bearings for supporting said rotor, a rotor position sensing means, and a housing surrounding said motor components;

(B) providing a hydraulic stage, said hydraulic stage including a body defining a bore, a spool valve disposed within said bore for reciprocal linear movement therein for controlling the flow of fluid under pressure therethrough responsive to limited rotation of said rotor;

(C) positioning the completely packaged motor upon the body of said hydraulic stage;

(D) mechanically interconnecting said rotor drive means of said motor and said spool valve of said hydraulic stage;

(E) applying an electrical signal to the motor which signal is indicative of a desired predetermined output from the hydraulic stage;

(F) measuring the output of the hydraulic stage;

(G) relatively moving said torque motor on said body of said hydraulic stage;

(H) determining when the output of the hydraulic stage reaches said predetermined desired output; and (I) securing said motor to said hydraulic stage body while maintaining said predetermined desired output.

2. The method of manufacturing a direct drive servovalve as defined in claim 1 wherein said relatively moving step includes rotation of said motor while continuously measuring the output of said hydraulic stage until said predetermined output therefrom is obtained.

3. The method of manufacturing a direct drive servovalve as defined in claim 1 wherein said motor is provided with hold down means and said securing step includes tightening fasteners received by said hold down means.

4. The method of manufacturing a direct drive servovalve as defined in claim 3 wherein said motor housing is provided with a groove adjacent an end thereof engaging said body and said hold down means includes cleats engaging said groove and said cleats are held in place by tightening said fasteners.

5. A limited angle rotary-to-linear direct drive servovalve comprising:

(A) a hydraulic stage including
 (1) a body defining a bore therein, and
 (2) a valve member disposed within said bore for reciprocal linear movement for controlling flow of fluid from a source thereof through said valve;

(B) a completely packaged self contained rotary limited angle torque motor having all required motor components therein including (1) a stator, (2) a rotor having a drive means, (3) stop means for limiting the angle of rotation of said rotor, (4) an isolation tube surrounding said rotor to isolate said stator from system fluid, (5) support bearings for supporting said rotor, (6) a rotor position sensing means, and (7) a housing means surrounding said motor components;

(C) hold down means including fastener means for securing said motor on said hydraulic stage body, and (D) said motor being rotationally moveable on said body when said fastener means is loose and non-moveable when said fastener means is tightened.

6. A limited angle direct drive servovalve as defined in claim 5 wherein said hold down means includes a continuous groove defined by said housing means and disposed adjacent said body and a plurality of cleats engaging said groove and said body, said fastener means passing through said cleats and into said body.

7. A limited angle direct drive servovalve as defined in claim 6 wherein said cleats each includes a radially inwardly directed flange extending into said groove.

8. A limited angle direct drive servovalve as defined in claim 5 which further includes an electronic controller and means for coupling said controller to said motor.

9. A limited angle direct drive servovalve as defined in claim 8 which further includes a controller housing, said controller being disposed within said controller housing, and means for affixing said controller housing to said motor housing.

10. A limited angle direct drive servovalve as defined in claim 9 wherein said means for affixing said controller housing to said motor housing includes a cup-like member extending from said controller housing, said motor being received within said cup-like member.

* * * * *